United States Patent [19]

Takahashi et al.

[11] Patent Number: 4,976,860
[45] Date of Patent: Dec. 11, 1990

[54] CONJUGATED POLYMER-CATION EXCHANGER COMPOSITE MEMBRANE

[75] Inventors: Hiromichi Takahashi, Sennan; Kaoru Tsujii, Wakayama, both of Japan

[73] Assignee: KAO Corporation, Tokyo, Japan

[21] Appl. No.: 228,314

[22] Filed: Aug. 4, 1988

[30] Foreign Application Priority Data

Aug. 4, 1987 [JP] Japan .................................. 62-195481

[51] Int. Cl.$^5$ .............................................. B01D 71/44
[52] U.S. Cl. ......................... 210/500.28; 210/500.33; 210/500.36; 210/638
[58] Field of Search ............. 210/638, 500.27, 500.28, 210/500.33, 500.36

[56] References Cited

U.S. PATENT DOCUMENTS

| | | | |
|---|---|---|---|
| 4,414,111 | 11/1983 | Iwaisako et al. | 210/638 |
| 4,514,304 | 4/1985 | Miyaki et al. | 210/638 |
| 4,770,786 | 9/1988 | Manabe et al. | 210/500.29 |

Primary Examiner—Ivars Cintins
Attorney, Agent, or Firm—Wenderoth, Lind & Ponack

[57] ABSTRACT

Disclosed is a conjugated polymer-cation exchanger composite membrane suitable for a charge-mosaic membrane which is easily prepared and has excellent mechanical or chemical strength and good properties for charge-mosaic membrane. The composite membrane of the present invention comprises a conjugated polymer and cation exchangers dispersed therein.

5 Claims, 2 Drawing Sheets

CONJUGATED POLYMER-CATION EXCHANGER COMPOSITE MEMBRANE

FIELD OF THE INVENTION

The present invention relates to a conjugated polymer-cation exchanger composite member and a process for preparing the same. More particularly, it relates to a charge-mosaic membrane suitable for concentration of an electrolyte solution or for separation of electrolytes from mixed solutions of electrolytes and low-molecular-weight nonelectrolytes, and to a process for preparing the same.

BACKGROUND OF THE INVENTION

A charge-mosaic membrane is a membrane which consists of parallel arrays of anion-exchange and cation-exchange elements passing through the membrane. When the membrane is applied to the permeation of an electrolytic solution, circulating electric currents are passed between the anion-exchange and cation-exchange elements through which ions are passed. As a result, the electrolytes are rapidly transferred in comparison with the nonelectrolytes. This phenomenan can be applied for many usages. For example, the charge-mosaic membrane is applicable to a membrane of piezodialysis used for concentration of an electrolyte solution, although the concentration was difficult in a conventional membrane separation technique. It also is used as a dialysis membrane for separation of electrolytes from mixed aqueous solutions of electrolytes and nonelectrolytes, or for separation or purification of amphoteric electrolytes, such as amino acid.

The charge-mosaic membrane was initially prepared by a method wherein cation exchangers were united to anion exchangers or by a method wherein a resin membrane was partially immersed in a reaction solution for introducing both type of ion exchange groups into it (see U.S. Pat. No. 2,987,472; F. de Korosy, Nature, 197,635 (1963)). It is also reported that a membrane prepared by embedding a cation resin and an anion resin in a silicone resin membrane exhibits transfer phenomenon characterized by a charge-mosaic membrane (see J. N. Weinstein et al., Desalination, 12, 1(1973)). However, these initially developed membrane has large domains and are insufficient in mechanical strength. They also are difficult to produce in industrial scale.

Thereafter, it is also proposed that a charge-mosaic membrane is prepared by a casting method (see J. Shorr et al., Desalination, 14, 11(1974)), a blending method (Japanese Laid-Open Specification No. 14389/1979), a pile method or a suspension method. The casting method is a method wherein two different resins are poured in a mold and the blending method employs phase separation phenomenon which occurs when more than two different polymers are blended. The pile method is carried out by alternately piling a cation exchange film and an anion exchange film and then cutting it perpendicular to a film surface. Also, the suspension method is conducted by suspending particles having one ion exchange group in a polymer solution which can have the other ion exchange group to obtain a mosaic structure. These methods, however, have defects in formation of ion complex or film strength and therefore it is desired to obtain a charge-mosaic membrane not having the defects.

Nowadays, new methods, such as an ionotropic-gel membrane method (H. J. Purz, J. Polym. Sci., Part C, 38, 405(1972)), a latex-polymer electrolyte method (Japanese Laid-Open Specification No. 18482/1978) and a block copolymerization method (Y. Isono et al., Macromolecules, 16, 1(1983)), have been proposed. The ionotropic-gel membrane method is a method producing a charge mosaic membrane by forming an ionotropic-gel membrane having a columner pore of which gel portion was constituted with one ion exchange resin and then filling the pore with the other ion exchange resin. This method could realize an almost ideal mosaic structure if it was perfectly conducted, but actually such an ideal mosaic structure has not been obtained. The latex-polymer electrolyte method is divided into two. One is a method wherein a mixture of a styrenebutadiene copolymer latex and polystyrene sulfonic acid is formed into a film which is then cross-linked and chloromethylized followed by amination. The other is a method wherein a mixture of a styrene-butadiene copolymer latex and a quaternary aminated chloromethylstyrene is formed into a film and then cross-linked and sulfonated. It, however, is difficult for the above mentioned methods to control such chemical treatments. The block copolymerization method can miniaturize the size of ion exchange areas. In this method, the mosaic structure is obtained by utilizing microphase separation phenomenon when forming a film by evaporating a block copolymer solution. Then, anion and cation exchange groups are selectively introduced into the copolymer by suitable reactions to form a charge mosaic membrane. The method initially employed a diblock copolymer, but nowadays employs a pentablock copolymer. However, it is very difficult that each ion-exchange element passes through the membrane. It also is difficult to synthesize the block copolymers and to establish a film-forming process.

In the meanwhile, since it was found that a doped polyacetylene indicates metal conductivity, new conductive polymers has been intensely developed as well as the study of the electroconductivity of the polyacetylene. Especially, since a film of an aromatic compound was obtained by an electrolytic oxidative polymerization, development has been rapidly progressed.

A conductive polymer, such as polypyrrole, has electrochemical anode doping characteristics and therefore the anion of supporting electrolytes is grasped by the positive charge of the partially oxidated matrix. In other words, as the oxidation potential of the polymer is lower than that of the monomer, the polymer prepared by oxidative polymerization is partially oxidized prior to the monomer. The polymer catches a counter anion of the supporting electrolyte in the electrolyte solution and thus anode doping is simultaneously progressed with the polymerization. This polymerization system makes it possible to enhance the electroconductivity of the polymer (for example, A. F. Diaz et al., J. Chem. Soc., Chem. Commun., 1979, 635; Japanese Laid-Open Specification No. 133127/1982; Japanese Laid-Open No. 226020/1984; M. Satoh et al., J. Chem. Soc., Chem., Commun., 1985, 1629).

Further, it has been reported that a conductive polymer easily prepared by electrolytic oxidative polymerization of a heterocyclic compound and aromatic amino compound has high conductivity and heat and chemical stability. This polymer, therefore, becomes noteworthy in wide variety of fields, such as organic secondary cells, sensors, optoelectronics, external control transfer membranes, organic electronics device, redox catalysts and the like, as well as organic conductive materials. However, it has not applied to a conjugated polymer-cation exchanger composite membrane yet.

SUMMARY OF THE INVENTION

The present invention is to provide a conjugated polymer-cation exchanger composite membrane suitable for a charge-mosaic membrane which is easily prepared and has excellent mechanical or chemical strength and good properties for charge-mosaic membrane. The composite membrane of the present invention comprises a conjugated polymer and cation-exchangers dispersed therein.

The present invention also provide two preparation methods of the above composite membrane. One is a process characterized by electrochemically oxidative-polymerizing a monomer for a conjugated polymer in a solution containing cation exchangers. The other is a process characterized by electrochemically oxidative-polymerizing a monomer for a conjugated polymer in a solution containing a supporting electrolyte by employing as anode an electrode on which cation exchangers are coated.

DETAILED DESCRIPTION OF THE INVENTION

Figure 1:
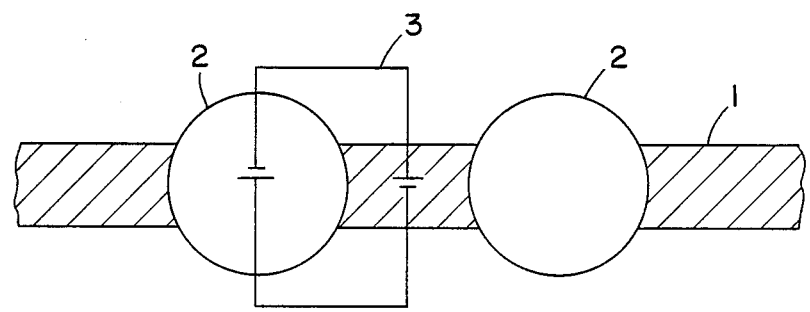
FIG. 1 is a drawing schematically showing a sectional view of the conjugated polymer-cation exchange resin composite membrane.

The conjugated polymer employed in the present invention is a polymer having a conjugated construction in main chain. Non-limited examples of the conjugated polymers are polypyrrole, polythiophene, polyfurane, polyselenophene, polyaniline, polypyridazine, polyazophenylene, poly-p-phenylene, polynaphthalene, polyanthracene, polyacetylene, polyacene, poly-p-phenylenevinylene or a substituted one thereof, such as 3,4-$C_1$-$C_4$ alkylpyrrole, 3,4-arylpyrrole, N-$C_1$-$C_4$ alkylpyrrole, 3-$C_1$-$C_4$ alkylthiophene.

The conjugated polymer-cation exchanger composite membrane can be prepared as follow: (1) A monomer for the conjugated polymer is dissolved or dispersed in an electrolytic solution containing a suitable polar solvent, and cation exchangers dispersed therein, and electrodes are then immersed therein to apply a voltage. After applying a certain amount of electricity, an anode is taken out of the solution and rinsed. The anode is then immersed in another electrolytic solution containing supporting electrolyte and the monomer for the above conjugated polymer and an electric potential is applied between the anode and a cathode to form a conjugated polymer-cation exchanger composite membrane on the anode. (2) A monomer of the conjugated polymer and a supporting electrolyte are dissolved or dispersed in a suitable polar solvent to form an electrolytic solution. Electrodes are immersed in the electrolytic solution and an electric potential is applied, wherein an anode of the electrodes are coated with cation exchangers. The electrode employed in the above preparation is not limited, for example a conductive material, such as metal or semiconductor. The shape of the electrode also is not limited and can be a drum shape which makes possible continuous production (see Japanese Laid-Open Specification Nos. 228548/1985 or 72031/1986). Applied voltage can generally be from 0.2 to 30 V, preferably 0.2 to 10 V. The supporting electrolyte for electrolytic reaction can be conventional one known to the art. In an ideal charge-mosaic membrane, an exchange amount of the cation exchange area is equal to that of the anion exchange area. In the present invention, first of all, an exchange capacity of the cation exchanger incorporated into the membrane is calculated. Then, the integrated charge during electrolytic oxidative polymerization is controlled such that the anion exchange capacity is equal with the calculated cation exchange capacity, thus an amount of the conjugated polymer being controlled.

The cation exchanger of the present invention include;

(1) strong acid cation exchange resins, such as sulfonated polystyrene-divinylbenzene copolymer, phenolsulfonic acid-formaldehyde condensate, vinylsulfonic acid condensate, p-sulfonamidestyrene-styrene-di(p-vinylphenyl)sulfone copolymer and the like, some of which are available from Organo Company as Amberlite IR-120B, IR-122 and IR-124, from Dow Chemical Company as Dowex 50WX1, 50WX2, 50WX4, 50WX8, 50WX10, 50WX12 and 50WX16, from Diamond Shamrock Company as Duolite C-20, from Mitsubishi-Kasei Corp. as Dia-ion SK1B, SK110 and SK112, from Muromachi Kagaku Kogyo-Kaisha-Ltd. as Muromac 50WX1, 50WX2, 50WX4, 50WX8, 50WX10, 50WX12, 50WX16 and the like;

(2) weak acid cation exchange resins, such as methacrylic acid-divinylbenzene copolymer, maleic anhydridestyrene-divinylbenzene copolymer, phenolcarboxylic acidformaldehyde condensate, diallyphosphonic acid resins, phosphonic acid or phosphinic acid of styrene-divinylbenzene copolymer and the like, some of which are available as Amberlite IRC-50 and IRC-84, H70, Dia-ion WK10, WK11 and the like;

(3) fluorine-containing cation exchange resins, such as perfluorosulfonic acid prepared by hydrolysis of a copolymer composed of tetrafluoroethylene and perfluoro(alkylvinylethyersulfonyl fluoride) (i.e. perfluoro(3,6-dioxa-4-methyl-7-octenesulfonyl fluoride)), and a copolymer of perfluorovinylether and tetrafluoroethylene to which at least one a sulfon group and a carboxyl group is added;

(4) cation exchange celluloses, such as diethylamino cellulose, sulfomethyl cellulose, carboxymethyl cellulose and the like;

(5) zeolites having cation exchange capacity, such as faujasite, mordenite, offretite, cancrinite, heulandite, stilbite, chabazite, ferrierite, zeolite A, zeolite X ziolite Y, zeolite L, zeolite omega, erionite, ZSM-4, ZSM-5, clinoptilolite and the like;

(6) water-insoluble polybasic acids having cation exchange capacity, for example phosphate, molydate, tangstate of tetravalent metal (titanium, zirconium, hafnium and tin), such as titanium phosphate, zirconium phosphate, hafnium phosphate, zirconium tungstate, zirconium molybdate, tin phosphate and the like;

(7) heteropolyacid made of phosphorus, germanium, silicon, molybdenum, tungsten, vanadium and the like, or a salt therefrom, for example 12-molybdophosphoric acid, 11-molybdo-1-vanadophosphoric acid, 10-molybdo-2-vanadophosphoric acid, 9-molybdo-3-vanadogermanic acid, 9-molybdo-3- vanadosilicic acid, 9-tangsto-3-vanadophosphoric acid, 6-molybdo-3-vabadisilicic acid, 6-tangsto-3-vanadogermanic acid and the like;

(8) hydrate oxides, such as hydrate silica, hydrate titania, hydrate zirconia and the like, and composite oxides, such as silica-titania, titania-alumina, silica-alumina, silica-magnesia, alumina-zirconia and the like;

(9) acid clay minerals, such as activated clay, Japanese acid clay and the like; and

(10) a mixture thereof.

Cation exchange capacity of the above mentioned ion exchangers is at least 0.1 meg/g, preferably at least 0.5 meg/g. The larger the ion exchange capacity, the better, but it is difficult to obtain cation exchange capacity of at least 5 meg/g. Among the above cation exchangers, preferred for the present invention are the cation exchange resins and the zeolites.

The shape of the cation exchangers is not limited, but preferred size of the cation exchanger is within the range of 0.3 to 10 micrometer because thick film increases membrane permeation resistance. The cation exchanger having a size of the above range increases circulating electric currents in number per unit area to enhance the properties of the charge-mosaic membrane.

In the preparation of the conjugated polymer, the above cation exchangers are dispersed in an electrolytic solution or coated on an electrode. The number of the exchangers is at least $5 \times 10^7$ particles/ml in the electrolytic solution and at least $2 \times 10^4$ particles/cm$^2$, preferably at least $4 \times 10^4$ particles/cm$^2$ for coating. When the cation exchangers are coated on an electrode, a coating composition dispersing cation exchangers in a film-forming resin composition can be employed. Examples of the film-forming resins are polyvinyl chloride resins, polystyrene resins, acrylate polymer, methacrylate polymer and the like, but they are not limited to the above listed one. They include all film-forming resin capable of forming a uniform film when coated on the electrode. The concentration of the coating composition is 0.1 to 10% by weight, preferably 0.3 to 1% by weight.

The porous support employed in the present invention can be one which has very small permeation resistance and has a function supporting the composite membrane of the present invention. The shape of the substrate also is not limited, such as panel, film, tube and the like. Examples of the porous substrates are glassy porous materials, sintered metals, ceramics, cellulose ester, polyethersulfone, polysulfone, polyimide, polytetrafluoroethylene, polyvinyl fluoride, nylon 6, polyacrylonitrile, polyvinyl chloride, polymethyl methacrylate and the conjugated polymer mentioned above.

The process for uniting the composite membrane of the present invention with the porous support is as follow: (1) the conjugated polymer-cation exchanger composite membrane is floated on the surface of water and dipped up from water with the porous support membrane to attach it. (2) The composite membrane is pumped up on the porous support by a vacuum pump. (3) The composite membrane is pressed on the porous support. (4) The composite membrane is prepared and then continued to prepare under a condition making the membrane porous. The above process is not limited. If desired, the composite membrane may be attached on the porous support by using adhesives. The united composite membrane is further subjected to a heat treatment to enhance adhesive properties.

The conjugated polymer-cation exchanger composite membrane of the present invention is explain by using a drawing. FIG. 1 is a drawing schematically showing a sectional view of the conjugated polymer-cation exchange resin composite membrane. As is appeared from FIG. 1, the cation exchanger 2 is dispersed in the conjugated polymer membrane 1. The conjugate polymer membrane 1 is acted as an anion exchange membrane and a circulating electric current generates between the cation exchange area and the anion exchange area as indicating 3 in FIG. 1. The current accelerates transport of the electrolyte. By the term "disperse" herein is meant that the cation exchangers 2 are mechanically and/or chemically retained with scattered in the conjugated polymer 1.

Example

The present invention is illustrated by the following examples which, however, are not to be construed as limiting the invention to their details.

Example 1

One gram of cation exchange resin particles having a particle size of 2.6 micrometer and an exchange capacity of 3.1 meg/g was added in 200 ml of an acetonitrile solution containing 0.1M of pyrrole, in which a transparent electrode coated glass electrode (hereinafter referred to as "Nesaglass electrode") and a nickel cathode both having 6.0 cm $\times$ 7.0 cm were immersed. A voltage was applied between both electrodes sufficient to have a current density of 7.5 $\mu$A/cm$^2$. After passing 0.1 Coulomb, the electrodes were taken out from the electrolytic solution and the anode was rinsed with ion exchanged water and ethanol. The electrodes, then, were immersed in an acetonitrile solution containing 0.5M of pyrrole and 0.05M of tetraethylammonium-p-toluenesulfonate and a voltage was applied between both electrodes sufficient to have a current density of 0.3 mA/cm$^2$. After passing 12 Coulomb, the electrodes were taken out from the electrolytic solution and the produced polypyrrole-cation exchange resin composite membrane was removed from the surface of the electrode to rinse with acetone and then dry under a reduced pressure at room temperature. The obtained polypyrrole-cation exchange resin composite membrane was immersed over night in an aqueous solution for a permeability test and subjected to the permeability test.

Figure 2:
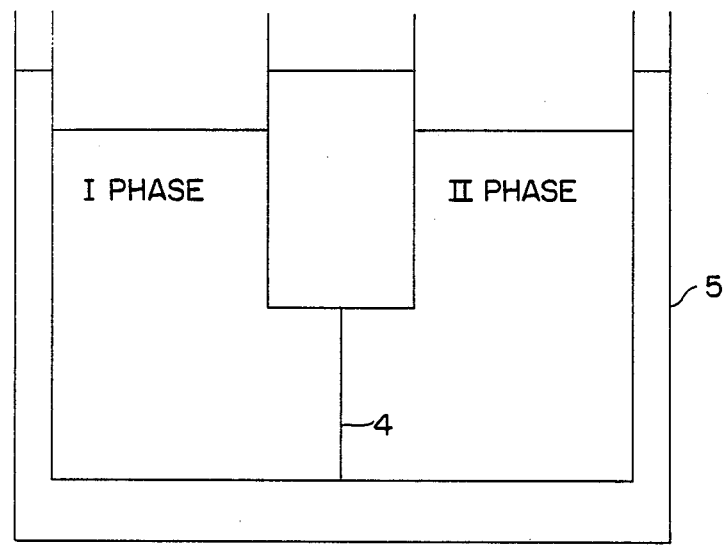
FIG. 2 is a drawing showing a container employed in Examples.

The permeability test, as shown in FIG. 2, was carried out by holding the composite membrane 4 between two 400 ml cells in a thermostat 5, one of which was filled with ion exchanged water and the other filled with three different solutions, i.e. an electrolytic solution, a nonelectrolytic solution and a mixture thereof. An area of the permeation membrane was 12.6 cm$^2$ and a test temperature was 25° C. The result is shown in Table 1.

TABLE 1

| I Phase | II Phase | Permeability coefficient (cm/sec) |
|---|---|---|
| 100 mM Sodium chloride solution | Ion exchanged water | $6.5 \times 10^{-4}$ |
| 100 mM Glucose solution | Ion exchanged water | 0 |
| Mixture solution of 100 mM sodium chloride and 100 | Ion exchanged water | NaCl $5.9 \times 10^{-4}$ Glucose 0 |

TABLE 1-continued

| I Phase | II Phase | Permeability coefficient (cm/sec) |
|---|---|---|
| mM glucose | | 5 |

A concentration of sodium chloride was determined by electric conductivity using an apparatus available from TOA Electronics Ltd. as CM-20S and that of glucose was determined by using Glucose B-Test wako available from Wako Pure Chemical Industries, LTD. The cation exchange resin particles were prepared as follow:

A one liter four neck flask was charged with 670 g of ion exchange water and 73 g of styrene and heated to 80° C. in an oil bath with stirring under nitrogen blanket. Then, 0.74 g of potassium persulfate as polymerization initiator was added and heating was continued with stirring, while the stirring rate was adjusted to 350 rpm. The polymerization reaction was terminated for 5 to 10 hours and the agglomerate was filtered away to obtain a latex. A particle size of the latex was determined by a submicron particle analyzer available from Colter Company as Model N4 and a scanning type electron microscope available from Nippon Electronics Company as JSM-35C to find an average particle size of 980 nm. Next, 2 g of the latex thus obtained, 0.13 g of sodium dodecylsulfate and 200 g of ion exchanged water were charged in a 300 ml beaker and dispersed by a super sonic generator (herein referred A solution). Another 500 ml beaker was charged with 46 g of styrene, 4 g of divinyl benzene, 25 g of isoamyl acetate, 0.9 g of benzoyl peroxide, 0.38 g of sodium dodecylsulfate and 320 g of ion exchanged water and emulsified by a phone type super sonic generator with cooling (herein referred B solution). On the super sonic radiating both A and B solutions, the solutions were mixed in a one liter four neck flask and allowed to stand with stirring at 40° C. in an oil bath for three hours. After confirming the particle size by a microscope, 150 ml of a 3% polyvinyl alcohol aqueous solution was added to heat the oil bath to 80° C. The polymerization reaction was terminated after 10 hours and the agglomerate was filtered away to rinse with boiled water and acetone followed by drying under a reduced pressure at room temperature. Another 500 ml four neck flask was charged with 0.2 g of silver sulfate and 150 ml of concentrated sulfuric acid and heated to 80° C. in an oil bath, to which 20 g of the resin particle obtained above was added and held at 100° C. for 3 hours. After cooling to room temperature, it was further allowed to stand for several hours. The content of the flask was then poured in a beaker containing one liter of a 20% sulfuric acid and, after cooling, the yellowish blown particles were filtered out to rinse with large amount of water. The exchange capacity of the obtained cation exchange resin particles was determined in a conventional method to find 3.1 meg/g -dry resin.

EXAMPLE 2

One gram of zeolite (available from Toyo Soda MFG Co. Ltd. as Zeoram A-3) was added in 200 ml of acetonitrile solution containing 0.1M of pyrrole, in which a Nesaglass electrode and a nickel cathode both having 6.0 cm×7.0 cm were immersed. A voltage was applied between both electrodes sufficient to have a current density of 7.5 $\mu A/cm^2$. After passing 0.15 Coulomb, the electrodes were taken out from the electrolytic solution and the anode was rinsed with ion exchanged water and ethanol. The electrodes, then, were immersed in an acetonitrile solution containing 0.5M of pyrrole and 0.05M of tetraethylammonium-p-toluenesulfonate and a voltage was applied between both electrodes sufficient to have a current density of 0.3 mA/cm$^2$. After passing 15 Coulomb, the electrodes were taken out from the electrolytic solution and the produced polypyrrole-zeolite composite membrane was removed from the surface of the electrode to rinse with acetone and then dry under a reduced pressure at room temperature. The obtained polypyrrole-zeolite composite membrane was immersed over night in an aqueous solution for a permeability test and subjected to the permeability test, as generally described in Example 1. The result of the test is shown in Table 2.

TABLE 2

| I Phase | II Phase | Permeability coefficient (cm/sec) |
|---|---|---|
| 100 mM Sodium chloride solution | Ion exchanged water | $1.9 \times 10^{-4}$ |
| 100 mM Glucose solution | Ion exchanged water | $4.1 \times 10^{-6}$ |

EXAMPLE 3

A supporting electrolyte, i.e. tetraethylammonium-p-toluenesulfonate, was added in acetonitrile solution containing 0.1M of pyrrole to form a 0.05M electrolytic solution. Cation exchange resin particles prepared in Example 1 were coated on a Nesaglass electrode having 6.0 cm×7.0 cm and was immersed in the obtained electrolytic solution as an anode, while a nickel plate having the same size was immersed as cathode. A voltage was applied between both electrodes sufficient to have a current density of 0.3 mA/cm$^2$. After passing 12 Coulomb, the electrodes were taken out from the electrolytic solution and the produced polypyrrole-cation exchange resin composite membrane was removed from the surface of the electrode to rinse with acetone and then dry under a reduced pressure at room temperature. The obtained polypyrrole-cation exchange resin composite membrane was immersed over night in an aqueous solution for a permeability test and subjected to the permeability test, as generally described in Example 1. The result of the test is shown in Table 3.

TABLE 3

| I Phase | II Phase | Permeability coefficient (cm/sec) |
|---|---|---|
| 100 mM Sodium chloride solution | Ion exchanged water | $5.5 \times 10^{-4}$ |
| 100 mM Glucose solution | Ion exchanged water | 0 |

The cation resin particles-coated Nesaglass electrode was prepared as follow: The cation exchange resin particles were added to a tetrahydrofurane solution containing 0.5% by weight of polyvinyl chloride to form a coating solution containing 10% by weight of the resin particles. Several drops of the coating solution were dropped onto a Nesaglass electrode and coated thereon by using YBA type baker applicator available from Yoshimitsu Seiki Company. The electrode was dried for more than one hour.

EXAMPLE 4

A supporting electrolyte, i.e. tetraethylammonium-p-toluenesulfonate, was added in an acetonitrile solution containing 0.5M of pyrrole to form a 0.05M electrolytic solution. The same zeolite as Example 2 was coated on a Nesaglass electrode having 6.0 cm×7.0 cm and was immersed in the obtained electrolytic solution as anode, while a nickel plate having the same size as the Nesaglass electrode was immersed in it as cathode. A voltage was applied between both electrodes sufficient to have a current density of 0.3 mA/cm$^2$. After passing 15 Coulomb, the electrodes were taken out from the electrolytic solution and the produced polypyrrole-zeolite composite membrane was removed from the surface of the electrode to rinse with acetone and then dry under a reduced pressure at room temperature. The obtained polypyrrole-zeolite composite membrane was immersed over night in an aqueous solution for a permeability test and subjected to the permeability test, as generally described in Example 1. The result of the test is shown in Table 4.

TABLE 4

| I Phase | II Phase | Permeability coefficient (cm/sec) |
|---|---|---|
| 100 mM Sodium chloride solution | Ion exchanged water | $1.5 \times 10^{-4}$ |
| 100 mM Glucose solution | Ion exchanged water | $2.8 \times 10^{-6}$ |

The zeolite-coated Nesaglass electrode was prepared as follow: The zeolite was added to a tetrahydrofurane solution containing 0.5% by weight of polyvinyl chloride to form a coating solution containing 10% by weight of the zeolite. Several drops of the coating solution were dropped onto a Nesaglass electrode and coated thereon by using YBA type baker applicator available from Yoshimitsu Seiki Company. The Nesaglass electrode was dried for more one hour.

EXAMPLE 5

The polypyrrole-cation exchange resin composite membrane prepared in Example 1 was floated on water and dipped out on a membrane filter having a pore size of 1 micrometer available from Advantec Company. The obtained composite membrane was subjected to the permeability test, as generally described in Example 1. The result is shown in Table 5.

TABLE 5

| I Phase | II Phase | Permeability coefficient (cm/sec) |
|---|---|---|
| 100 mM Sodium chloride solution | Ion exchanged water | $5.1 \times 10^{-4}$ |
| 100 mM Glucose solution | Ion exchanged water | 0 |

EXAMPLE 6

A polypyrrole-zeolite composite membrane prepared in Example 2 was floated on the surface of water and dipped out on a stainless mesh. The obtained composite membrane was subjected to the permeability test, as generally described in Example 1. The result is shown in Table 6.

TABLE 6

| I Phase | II Phase | Permeability coefficient (cm/sec) |
|---|---|---|
| 100 mM Sodium chloride solution | Ion exchanged water | $1.8 \times 10^{-4}$ |
| 100 mM Glucose solution | Ion exchanged water | $3.9 \times 10^{-6}$ |

EXAMPLE 7

A supporting electrolyte, i.e. tetraethylammonium-p-toluenesulfonate, was added in acetonitrile solution containing 0.2M of pyrrole to form a 0.1M electrolytic solution. Cation exchange resin particles (Muromac 50W-X8 of 400 mesh) were added to the electrolytic solution, in which a Nesaglass electrode having 3.5 cm×5.0 cm and a nickel plate having the same size were immersed. A constant voltage of 3.6 V was applied between both electrodes. After passing 80 Coulomb, the electrodes were taken out from the electrolytic solution and the produced polypyrrole-cation exchange resin composite membrane was removed from the surface of the electrode to rinse with acetone and then dry under a reduced pressure at room temperature to obtain a composite membrane of 70 micrometer. The obtained polypyrrole-cation exchange resin composite membrane was immersed over night in an aqueous solution for a permeability test and subjected to the permeability test.

The permeability test was carried out using a filter apparatus for reverse osmosis (available from ULVAC Service Corporation as RO-3). The area of permeation membrane was 4.9 cm$^2$. The test membrane was placed on a metallic porous support and a 0.1 mM potassium chloride solution was contacted with the membrane under a pressure of 60 Kg/cm$^2$ to conduct a test. The membrane has a permeation flux of 0.36 cm/hr and a concentration degree of 60%. The concentration degree was calculated from the following equation;

$$\text{Concentration degree (\%)} = \frac{\text{Permeating solution concentration} - \text{High pressure liquid concentration}}{\text{High pressure solution concentration}} \times 100$$

EXAMPLE 8

A supporting electrolyte, i.e. tetraethylammonium-p-toluenesulfonate, was added in and acetonitrile solution containing 0.2M of pyrrole to form a 0.1M electrolytic solution. Cation exchange resin particles (Muromac 50W-X8 of 400 mesh) were coated on a Nesaglass electrode having 3.5 cm×5.0 cm. The cation exchange resin particle-coated Nesaglass electrode and a nickel plate having the same size were immersed. A constant voltage of 3.6 V was applied between both electrodes. After passing 80 Coulomb, the electrodes were taken out from the electrolytic solution and the produced polypyrrole-cation exchange resin composite membrane was removed from the surface of the electrode to rinse with acetone and then dry under a reduced pressure at room temperature to obtain a composite membrane of 70 micrometer. The obtained polypyrrole-cation exchange resin composite membrane was immersed over night in an aqueous solution for a permeability test and subjected to the permeability test, as generally described in Example 7. The membrane has a permeation flux of 0.16 cm/hr and a concentration degree of 80%.

The cation exchange resin particles-coated Nesaglass electrode was obtained as follow: The cation exchange resin particles (Mumarock 50W-X8) were added in a tetrahydrofurane solution containing 0.5% by weight of polyvinyl chloride to form a coating solution containing 10% by weight of the resin particles. Several drops of the coating solution were dropped on a Nesaglass elecrode and coated by YBA type Baker Applicator. It was dried for more than one hour at room temperature.

EXAMPLE 9

A 10 mM glucose solution was contacted with polypyrrole-cation exchange resin composite membrane prepared in Example 8 under a pressure of 60 Kg/cm$^2$ and a permeability test was carried out. Its permeation flux was 0.23 cm/hr and no glucose was detected in the permeated solution. The detection of glucose was conducted with Glucose B-Test Wako (Wako Pure Chemical Industries, Ltd.).

EXAMPLE 10

A polypyrrole-cation exchange resin composite membrane prepared in Example 8 was held between a mixture of 10 mM of glucose and potassium chloride (I phase) and distilled water (II phase) and the concentration change of glucose and potassium chloride in I and II phase was measured with time. The result is shown in Table 7. The concentration of potassium chloride in I phase became lower with time, while that in II phase became higher with time. Even when the concentration of potassium chloride was equal in both I and II phase, no glucose was detected in II phase. This shows that electrolyte or low molecular weight nonelectrolyte can separate from a mixture containing both electrolyte and nonelectrolyte by using the polypyrrole-cation exchange resin composite membrane.

TABLE 7

| Time | Glucose concentration (mM) | | Potassium chloride concentration (mM) | |
|---|---|---|---|---|
| | I Phase | II Phase | I Phase | II Phase |
| 0 | 10 | 0 | 10 | 0 |
| 4 | 10 | 0 | 8.7 | 1.3 |
| 8 | 10 | 0 | 7.8 | 2.2 |
| 12 | 10 | 0 | 6.9 | 3.1 |
| 30 | 10 | 0 | 5 | 5 |
| 40 | 10 | 0 | 5 | 5 |

EXAMPLE 11

A permeability test of amino acid was carried out by using a polypyrrole-cation exchange resin composite membrane prepared in Example 1. The test was done by employing the same cell as Example 1 of which I phase was filled with a 10 mM glycine solution and II phase was filled with an aqueous solution having the same pH and ion strength as I phase. The permeation area was 12.6 and its temperature was 25° C. The result is showen in Table 8.

TABLE 8

| pH of I and II phase | Permeability coefficient of glycine |
|---|---|
| 2 | 1.33 × 10$^{-4}$ |
| 3 | 5.70 × 10$^{-5}$ |
| 4 | 0 |
| 6 | 0 |
| 9 | 1.07 × 10$^{-4}$ |
| 11.5 | 9.19 × 10$^{-5}$ |

Since pKa$_1$, pKa$_2$ and isoelectric point of glycine are respectively 2.3, 9.6 and 5.9, glycine exists as cation at a pH of not more than 1.3, as Zwitter ion at a pH of 2.3 to 9.6 and as anion at a pH of not less than 9.6. The Zwitter ion type glycine superficially has no electric charge. Accordingly, depending on the pH value of the solution, glycine can be changed betwee electrolyte and nonelectrolyte. Table 4 shows that, when glycine was electrolyte, it permeated through the membrane and when it was not electrolyte it was not able to permeate through the membrane. This evidences that the conjugated polymer-cation exchanger composite resin should be a charge mosaic membrane.

A pH of the solution was adjusted by mixing necessary amount of 100 mM H$_3$PO$_4$, KH$_2$PO$_4$, K$_2$HPO$_4$ and K$_3$PO$_4$ solutions. A pH of the glycine solution was adjusted by mixing necessary amounts of 100 mM H$_3$PO$_4$, KH$_2$PO$_4$, K$_2$HPO$_4$ and K$_3$PO$_4$ solutions containing 10 mM of glycine.

Quantitative determination of glycine was carried out by using nitrophenylized glycine. It was prepared by adding 1 ml of 4% sodium hydrogencarbonate solution and 1 ml of 0.1% trinitrobenzenesulfonic acid solution to 1 ml of II phase solution which was left for a suitable period of time. The resultant mixture was shielded with aluminum foil and allowed to stand at 50° C. for 2 hours. After cooling, 0.5 ml of 1M chloric acid was added to the mixture to terminate the reaction and the absorbance of 345 nm was measured to find a concentration of glycine.

EXAMPLE 12

A permeability test of amino acid was carried out by using a polypyrrole-zeolite composite membrane prepared in Example 2. The test was carried out as generally describen in Example 11. The result is shown in Table 9.

TABLE 9

| pH of I and II phase | Permeability coefficient of glycine |
|---|---|
| 2 | 8.6 × 10$^{-5}$ |
| 6 | 7.7 × 10$^{-5}$ |
| 10 | 1.2 × 10$^{-4}$ |

Table 9 shows that glycine permeated through the membrane when it was electrolyte, and that it did not permeate through when it was nonelectrolyte. Provide that, since when glycine is cation, it permeate through zeolite, the permeability coefficient of pH 2 was not so large in the test using Zeorum A-3 which has a small pore size. This also shows that the conjugate polymer-zeolite conjugate membrane of the present invention should be a charge-mosaic membrane.

What is claimed is:

1. A conjugated polymer-cation exchanger composite membrane which consists essentially of a conjugated polymer and cation exchangers dispersed therein, said conjugated polymer being selected from the group consisting of polypyrrole, polythiophene, polyfurane, polyselenophene, polyaniline, polypyridazine, polyazophenylene, poly-p-phenylene, polynaphthalene, polyanthracene, polyacetylene, polyacene, poly-p-phenylenevinylene or a substituted derivative thereof.

2. The composite membrane according to claim 1 wherein the membrane is supported on a porous support.

3. The composite membrane according to claim 1 wherein the cation exchangers are selected from the group consisting of cation exchange resin particles, zeolite, and mixtures thereof.

4. The composite membrane according to claim 3 wherein the membrane is supported on a porous support.

5. The composite membrane according to claim 3 wherein the cation exchange capacity of the cation exchangers is at least 0.1 meq/g.

* * * * *